Nov. 8, 1966   C. C. CONNELL   3,283,498
EXHAUST ELBOW

Filed Jan. 14, 1965   2 Sheets-Sheet 1

INVENTOR.
CALVIN C. CONNELL
BY
Wilson, Settle & Craig
ATTORNEYS

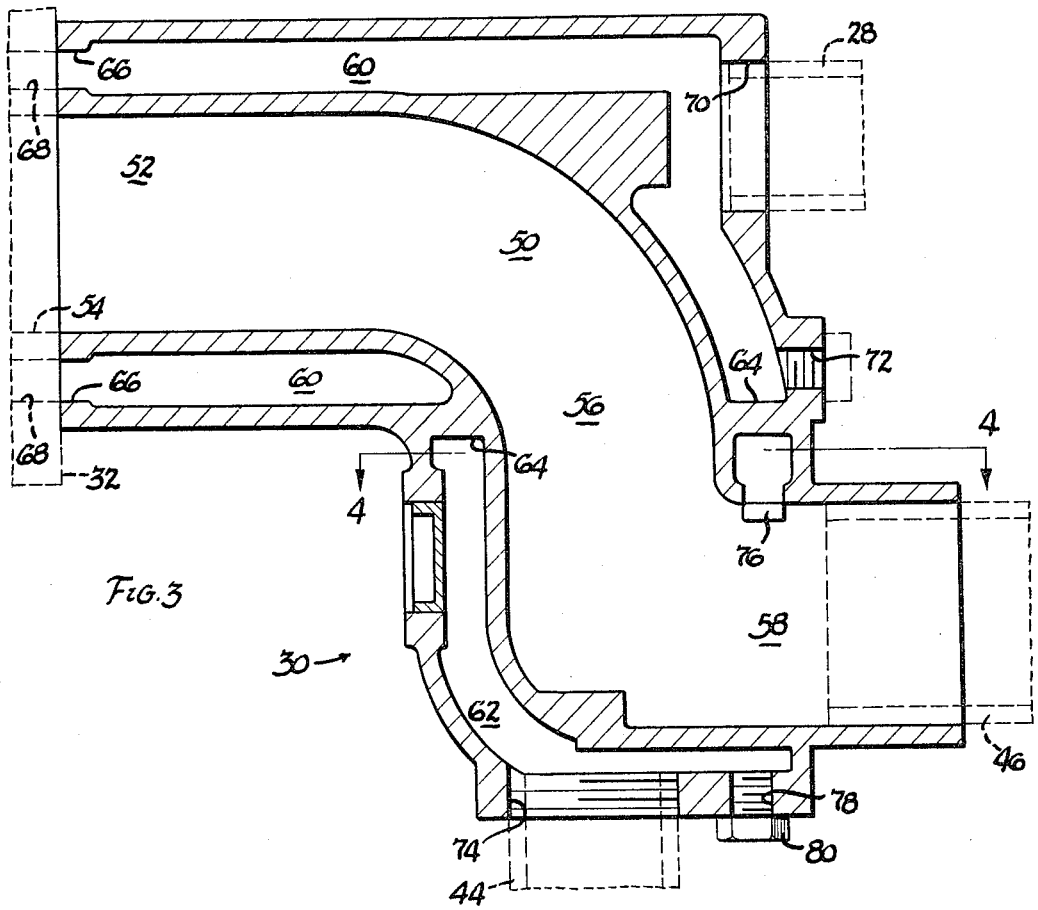
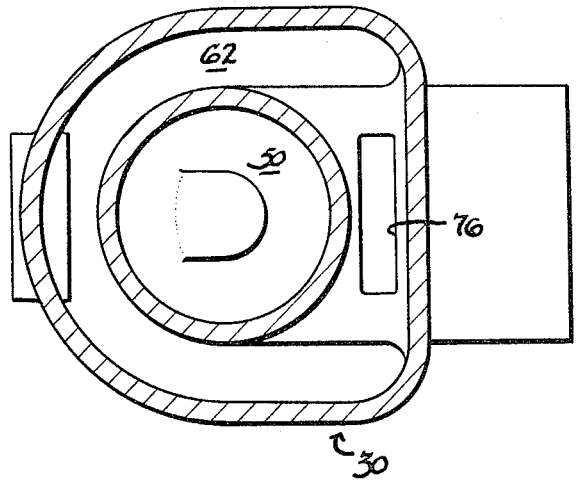

United States Patent Office 3,283,498
Patented Nov. 8, 1966

3,283,498
EXHAUST ELBOW
Calvin C. Connell, Bloomfield Hills, Mich., assignor to Crusader Marine Corporation, Warren, Mich., a corporation of Michigan
Filed Jan. 14, 1965, Ser. No. 425,554
4 Claims. (Cl. 60—30)

This invention relates to fittings for marine engine cooling systems, and more particularly to an exhaust elbow fitting for handling the exhaust gas, recirculating coolant water and coolant water discharge connections at the engine exhaust manifold.

In many marine engines, the coolant water for cooling the engine is drawn from the body of water in which the boat is floating, circulated through the system and discharged overboard through the engine exhaust pipe. While the engine is in operation, the exhaust passage becomes highly heated from the hot exhaust gases. When the engine is stopped, the cooling system pumps are also stopped and at the location where coolant water is discharged into the exhaust pipe, the surfaces in the region of the opening through which coolant water flows into the exhaust passage are no longer covered with water. Over a period of time, these surfaces become encrusted or salted from impurities in the coolant water. This action is accelerated by the hot exhaust passage which rapidly evaporates the water and bakes the impurities to form an encrustation which will eventually block or seriously impede the flow of coolant water being discharged into the exhaust pipe.

It is an object of the present invention to provide an improved exhaust elbow fitting for marine engine cooling systems which will effectively handle the flow of exhaust gases, recirculating coolant water and overboard discharge water.

It is another object of the invention to provide an exhaust elbow fitting for marine engine cooling systems in which the problem of salting or encrustation of passages within the fitting is effectively prevented.

The foregoing, and other objects and features of the invention will become apparent by reference to the following specification and to the drawings.

In the drawings:

FIGURE 3 is a detailed cross-sectional view of the fitting of FIGURE 2 taken on line 3—3 of FIGURE 2; and FIGURE 4 is a detailed cross-sectional view of the fitting taken on line 4—4 of FIGURE 3.

Figure 1:
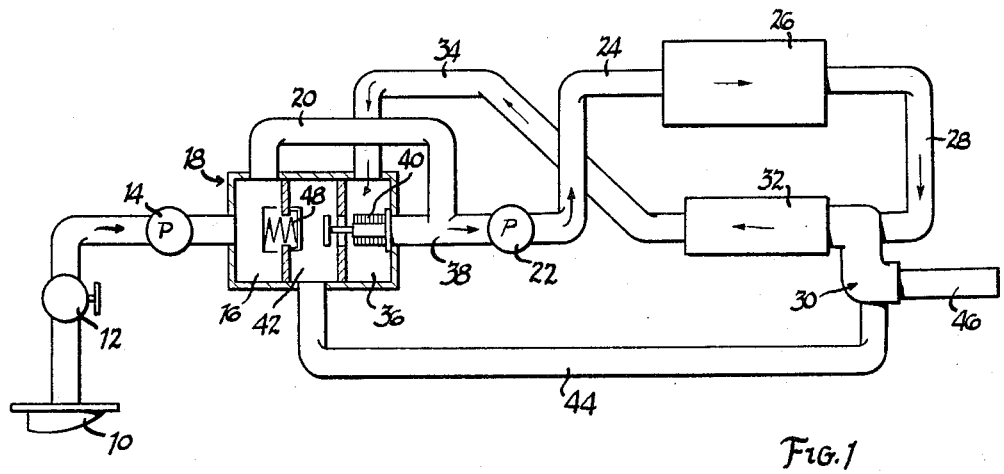
FIGURE 1 is a schematic diagram of a marine engine cooling system provided with a fitting embodying the invention.
Figure 2:
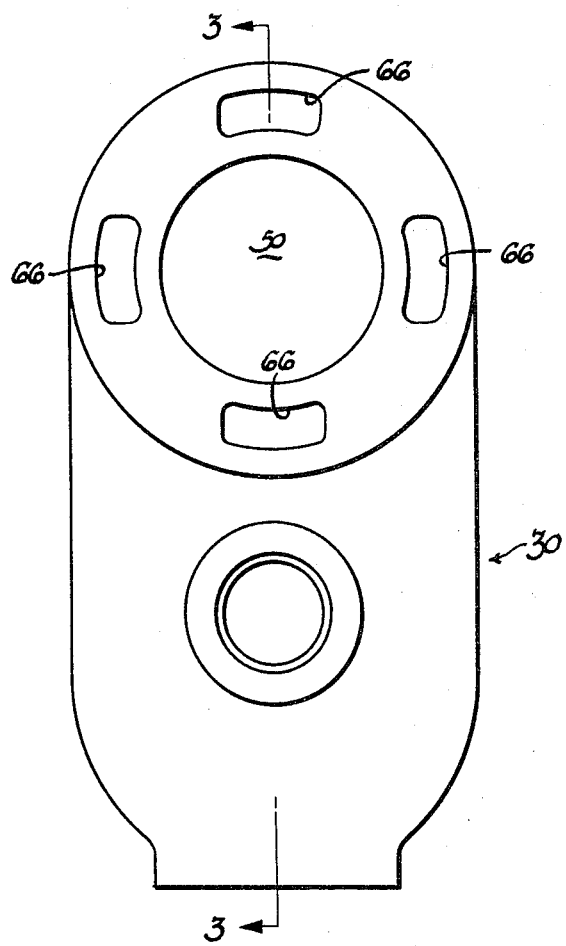
FIGURE 2 is a front end view of a fitting embodying the present invention.

In FIGURE 1, there is shown a typical marine engine cooling system which employs the fitting of the present invention. The system includes a sea scoop 10 which is connected through a normally open shut-off valve 12 to the intake of a raw water supply pump 14 whose outlet is connected to a first chamber 16 within a valve housing designated generally 18. A raw water supply conduit 20 connects chamber 16 to the intake side of a recirculatory pump 22 which is employed to recirculate water through the engine cooling system.

The normal recirculatory path of water through the cooling system is from the outlet side of recirculatory pump 22 through a conduit 24 to the water jacket 26 of the engine and thence through a conduit 28 to the exhaust elbow fitting designated generally 30 which is the subject of the present invention. Coolant flows from conduit 28 through fitting 30 in a manner to be described below and thence through cooling passages in the engine exhaust manifold 32 and from manifold 32 via a conduit 34 to a second chamber 36 in valve housing 18. In its normal recirculatory flow, water then flows from chamber 36 through a conduit 38 to the intake of recirculatory pump 22. A thermostatic valve 40 is located in chamber 36 to control a valve port between chamber 36 and a third chamber 42 in valve housing 18. When the temperature of water recirculating in the cooling system is below the desired temperature, valve 40 is closed to block communication with chamber 36 and chamber 42 and the coolant water is held within the recirculatory system.

When the coolant water temperature rises beyond the desired temperature, valve 40 opens to permit water to flow from chamber 36 into chamber 42 from which it is conducted by a discharge pipe 44 to exhaust elbow fitting 30 from which it is discharged through the fitting, in a manner to be described in detail below into the exhaust pipe 46 of the engine and discharged overboard through the exhaust pipe. On discharge of coolant water from the system in the manner described above, makeup water is automatically fed into the recirculatory system through conduit 20. When the recirculatory system is full, incoming raw water discharged from supply pump 14 into chamber 16 passes from chamber 16 through a pressure release valve 48 into chamber 42 and thence through pipe 44 and fitting 30 into the engine exhaust pipe 46.

The system described above is similar, in general, to that disclosed and claimed in my United States Patent No. 3,163,157, to which reference may be had for further details of the cooling system. The foregoing description will be of assistance in understanding the structure and operation of the fitting 30 which is the subject matter of this application.

As best seen in FIGURE 3, the elbow fitting embodying the present invention is formed with an internal passage 50 through which engine exhaust gases are conducted from manifold 32 into the exhaust pipe 46. Passage 50 includes a horizontally extending upper inlet section 52 which, when the fitting is in place, forms an extension of the gas outlet 54 of exhaust manifold 32. A vertically extending intermediate section 56 connects upper section 52 to a horizontally extending lower outlet section 58 to which exhaust pipe 46 is connected.

Housing 30 is formed with an external jacket which defines an upper chamber 60 which surrounds the upper portion of passage 50 and a second or lower chamber 62 which surrounds the forward end of outlet section 58 and approximately one-half of the immediate vertical exhaust gas passage section 56. Chambers 60 and 62 are completely separated from each other by a wall 64. At the left-hand or inlet end of fitting 30, chamber 60 is divided into a plurality of passages such as 66 which are located to communicate with internal coolant passages 68 within exhaust manifold 32. At its right-hand end, chamber 60 is formed with a port 70 which extends through the outer wall of the housing to communicate with conduit 28 of the cooling system. In the form of cooling system shown in the drawings, coolant water flows in FIGURE 3 from conduit 28 through port 70 into chamber 60 and thence from chamber 60 through ports 66 into the internal coolant carrying passages of the exhaust manifold 32. A tapped bore 72 in the lower portion of chamber 60 may serve either as a drain opening in the system of FIGURE 1 or alternatively may serve as a port by means of which a parallel branch of the recirculatory system may be connected in the diagram of FIGURE 1 between fitting 30 and the intake of recirculatory pump 22. Such a parallel branch may be employed to conduct coolant to a separate element, such as an oil cooler.

Lower chamber 62 is formed with an inlet opening 74 which is connected to one end of discharge conduit 44.

Water to be discharged overboard is fed into chamber 62 through opening 74 and rises within the chamber until the level of water within chamber 62 rises above a restricted opening 76 cut through the upper wall of passage section 58. Water to be discharged overboard flows into section 58 of passage 50 and is carried overboard by the flow of exhaust gases passing through exhaust passage 50 and exhaust pipe 46. A tapped bore 78 in the lower outer wall of chamber 62 serves to receive a drain plug 80.

By locating inlet 76 near the top of chamber 62, chamber 62 is kept substantially completely filled with water at all times, thus preventing the formation of salt on the internal walls of the chamber. While the cooling system is in operation, water is being continuously discharged through chamber 62 into the exhaust gas passage by the continuous operation of pump 14. When the motor is shut down, passage 44 is completely filled and maintained filled by the closure of valves 40 and 48 and chamber 62 remains filled up to the level established by opening 76. The normal motion of the boat is sufficient to keep the surfaces of chamber 62 above the level of opening 76 wetted at all times, thereby preventing the formation of salt on the internal chamber surfaces by the evaporation of raw water on the surfaces, such evaporation being greatly accelerated by the high temperature of the walls of the exhaust passage 50.

While one embodiment of the invention has been described in detail, it will be apparent to those skilled in the art that the disclosed embodiment may be modified. Therefore, the foregoing description is to be considered exemplary rather than limiting, and the true scope of the invention is that defined in the following claims.

I claim:

1. A cooling system for a marine engine having coolant conducting passages therein and an exhaust pipe for said engine for conducting exhaust gases away from said engine and for discharging coolant water from said coolant system, said coolant system including in combination a recirculatory liquid flow circuit including the coolant conducting passages, a raw water liquid flow passage connected to said recirculatory circuit for supplying makeup water thereto and connected to said exhaust pipe for discharging coolant water, a fitting coupling said exhaust pipe to said engine comprising a housing having first and second chambers therein, means defining an internal passage extending through said chambers from one end of said housing to the other for connection at one end to said engine and at the other end to said exhaust pipe, said first chamber surrounding a portion of said internal passage near said one end and said second chamber surrounding another portion of said internal passage near said other end, means for connecting said first chamber in said recirculatory liquid flow circuit to pass recirculated water through said first chamber and through said coolant conducting passages and means for connecting said second chamber in said raw water liquid flow passage to pass raw water through said second chamber and said exhaust pipe to discharge the same.

2. The cooling system of claim 1 wherein said first chamber and said portion of said internal passage therein are located above said second chamber and said other portion of said internal passage therein.

3. The cooling system of claim 2 including means defining an opening in the upper part of said other portion of said internal passage of said fitting communicating with the upper part of said second chamber for conducting water from said second chamber into said other portion of said internal passage.

4. The cooling system of claim 1 wherein the coolant conducting passages are in the exhaust manifold of said engine.

References Cited by the Examiner
UNITED STATES PATENTS

| | | | |
|---|---|---|---|
| 2,471,533 | 5/1949 | Morgan | 123—41.08 |
| 2,757,650 | 8/1956 | Holley | 123—41.08 |
| 3,105,708 | 10/1963 | Esty | 60—31 X |
| 3,163,157 | 12/1964 | Connell | 123—41.09 |

CARLTON R. CROYLE, *Primary Examiner.*
RALPH D. BLAKESLEE, *Examiner.*